United States Patent Office 2,724,439
Patented Nov. 22, 1955

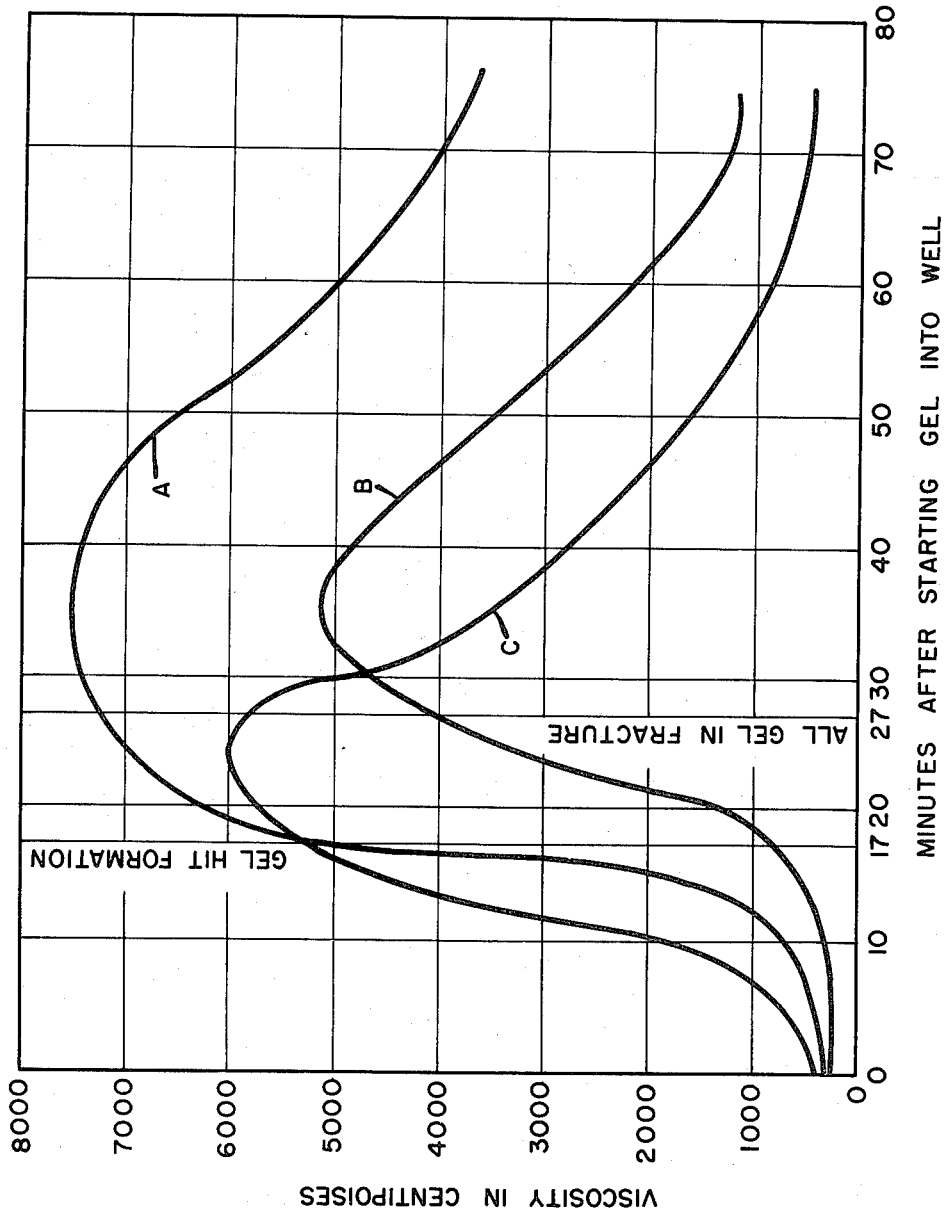

2,724,439

ALUMINUM SOAP COMPOSITION AND METHOD OF FRACTURING FORMATIONS

Harold W. Brainerd, Jr., Tulsa, Okla., assignor to Stanolind Oil and Gas Company, Tulsa, Okla., a corporation of Delaware Application December 5, 1952, Serial No. 324,362

4 Claims. (Cl. 166—22)

This invention pertains to an improved composition of matter and to a method of increasing the productivity of oil-producing formations using such composition. More particularly, this invention pertains to a gelled hydrocarbon which is especially adapted to fracturing formations in oil-producing wells.

Various compositions have been proposed and used for fracturing formations in accordance with the Hydrafrac process as described in U. S. Patent 2,596,843 Farris. U. S. Patent 2,596,844 Clark discloses a hydrocarbon gel which has often been used in this process. While that composition, a hydrocarbon gel formed with a napalm-type soap, is satisfactory in most instances for use in this process, it does have some limitations. That is, the rate of viscosity build-up, the maximum viscosity, the rate of peptization and the final viscosity have been found quite satisfactory but I have now found that these properties can be improved by the addition of another agent to the composition.

It is therefore an object of this invention to provide an improved composition of the hydrocarbon-napalm soap type for use in fracturing formations. It is a more specific object of this invention to provide an agent to add to a hydrocarbon-napalm soap type fracturing liquid which accelerates the gelation and peptization of a hydrocarbon-napalm gel so that the gel can be injected into a well at lower initial viscosity, so that no heat is required for gelation even at low atmospheric temperatures so that the gel can be injected into the well sooner, and so that the well can be placed on production sooner after a fracture has been made. These and other objects of this invention will become apparent from the following description, in which reference is made to the accompanying drawing.

This drawing shows a plot of the apparent viscosity versus time relationship for a typical composition made in accordance with this invention and, for comparison, shows a plot of the apparent viscosity versus time relationship for hydrocarbon-napalm soap gels heretofore proposed.

This invention comprises, in brief, the fracturing of a formation penetrated by a well wherein an unsaturated alcohol, particularly furfuryl alcohol, is added to hydrocarbon-napalm soap gels.

The hydrocarbons used in the hydraulic fracturing process, and particularly in this composition, may comprise any crude or refined hydrocarbon. The lighter refined hydrocarbons such as gasoline, kerosene and naphtha are preferred. Other hydrocarbons such as fuel oil, aromatic hydrocarbons, animal and vegetable oils and the like may also be employed.

These hydrocarbons may be gelled at atmospheric conditions or thereabouts with the napalm soaps. These soaps, as is well known, are mixed hydroxy aluminum soaps of saturated organic acids with unsaturated and/or cyclic organic acids. Typically, these soaps comprise a major proportion of aluminum soaps of unsaturated acids. Oleic acid, being the most plentiful, is normally used. The remainder of the hydrocarbon gelling agent consists of the hydroxy aluminum soaps of saturated fatty acids, typically the coconut oil fatty acids and, in some cases, a small percentage of the hydroxy aluminum soaps of cyclic acids, typically naphthenic acid. A typical napalm soap prepared by co-precipitation from a mixture of the sodium soaps of the acids where the acids are in the following proportions:

| | Per cent |
|---|---|
| Oleic acid | 65 |
| Coconut fatty acids | 35 |
| Naphthenic acid | 5 |

The proportions may be varied over a substantial range and, in some cases, the aluminum soaps of naphthenic acid are not included. On the other hand, the concentration of the aluminum soaps of naphthenic acid may be relatively high, as was proposed by the Chemical Warfare Service, U. S. Army. The composition used by the Chemical Warfare Service comprises the co-precipitated hydroxy aluminum soaps of 50 parts aluminum laurate (or a saturated fatty acid soap containing at least 40-50% of this substance or a functionally related soap), 25 parts of a hydroxy aluminum soap or soaps selected from the cyclo-paraffinic acids and 25 parts of a hydroxy aluminum soap of an unsaturated acid. This composition is described in Industrial and Engineering Chemistry, vol. 38, No. 8, August 1946, pp. 768-773. While the properties of these napalm soaps may be varied somewhat due to minor differences in the constituents, these co-precipitated aluminum soaps appear in general to have the property of gelling hydrocarbons at surface temperatures. In view of these minor variations, which are well known in this art, it is considered desirable in many instances to conduct a bench-scale blending of the hydrocarbon and the napalm soap to determine the proper proportions for the constituents. In any case, it has been found that between about 3 and about 6 parts by weight, based on the weight of the hydrocarbon, of these co-precipitated hydroxy aluminum soaps of organic acids produce a satisfactory gel for use in hydraulically fracturing formations.

Hydrocarbon gels containing this composition by themselves are quite stable. That is, the viscosity remains high almost indefinitely. In the process of hydraulically fracturing oil-producing formations, various materials have been added to this composition to cause the gel to revert to a low viscosity sol which readily flows out of a fracture in a formation. From about 0.5 to about 3 parts of water, based on the weight of the hydrocarbon, causes the viscosity of this gel to be reduced from greater than 5,000 centipoises Stormer to less than about 10 centipoises in about twenty-four hours. Curve A on the drawing is a plot of the viscosity of a gel having 100 parts kerosene, 5 parts napalm soap and 1 part water. These constituents were mixed at 85–90° F. and injected into a simulated 6,000-foot well when the viscosity was about 3 centipoises. By the time (17 minutes) the composition reached the formation where the temperature was 140° F., the viscosity of the gel was about 5,000 centipoises. For a period of one hour the viscosity of this gel remained above 5,000 centipoises and then gradually decreased over a long period of time until eventually the viscosity at twenty-four hours was less than 100 centipoises (not shown). Curve B on the drawing is a plot of the viscosity versus time for a similar composition in which the concentration of the soap was reduced from 5 to 4 parts by weight of the kerosene. It can be seen that by reducing the concentration of the soap the gelation rate was reduced by about fifteen minutes, so that when the first of the gel hit the formation its viscosity was only about 800 centipoises, the peptization or gel breakdown rate was reduced proportionally and that the maximum viscosity of the gel was substantially reduced.

Curve C on the drawing shows by comparison a plot of the viscosity versus time for a composition identical to the latter composition except that 0.3 part by weight of furfuryl alcohol was added to 100 parts kerosene, 4 parts napalm soap and 1 part water. The gelation rate of this composition is substantially higher than the gelation rate of the composition without the furfuryl alcohol (curve B). In fact, the gelation rate of this composition was even superior to the gelation rate of the composition containing 5 parts of napalm soap gelling agent. At the end of seventeen minutes, when the composition reached the formation, which was at 140° F., the viscosity of the gel was greater than 5,000 centipoises—a viscosity considered quite satisfactory for producing a fracture in a formation. This composition was like the composition shown in curve A in that the high viscosity was obtained at the bottom of the well, thus avoiding the difficulty of pumping a high viscosity liquid through the tubing down into the well. By comparison, in order to have a 5,000 centipoise gel at the time the composition reaches the formation, using a 4 parts napalm soap gel (curve B), it would be necessary to allow the composition to reach substantially maximum gelation at the surface and also to heat the composition to about 140° F.

A typical hydraulic fracturing job comprises injecting about 20 barrels of gel into a formation at a rate of about 2 barrels per minute. Accordingly, ten minutes are required to displace the gel into the formation. At 27 minutes on the plot, or in the simulated 6,000-foot well, ten minutes after the first of the gel contacted the formation, all of the gel was in the fracture and the viscosity was still substantially greater than 5,000 centipoises. The viscosity of the gel decreased rapidly almost immediately after it was all placed in the formation, and within a short time it had been reduced to substantially the viscosity of the well fluids. By comparison, it can be seen from curves A and B that the peptization rate of these compositions without the furfuryl alcohol is substantially slower.

The concentration of furfuryl alcohol in hydrocarbon-napalm soap gels can be varied somewhat. I have found that as the concentration of the furfuryl alcohol is increased, both the gelation rate and the peptization rate are increased and—in addition—the maximum viscosity is increased as the concentration of the furfuryl alcohol is increased up to about 0.5 part by weight based on 100 parts of hydrocarbon. With a greater concentration, I have found that the maximum viscosity is decreased and the gelation of the hydrocarbon and peptization of the gel are too fast to produce a satisfactory fracturing fluid for hydraulic fracturing in most formations, particularly high-temperature formations. Accordingly, the concentration of the furfuryl alcohol may be varied from between about 0.1 to about 0.5 part by weight, based upon 100 parts hydrocarbon, to produce a satisfactory hydrocarbon-napalm soap gel for formation fracturing. Inasmuch as the furfuryl alcohol peptizes the gel, the small amount of water may sometimes be left out of the composition and obtain satisfactory results. Gels of this type are sometimes preferred in shaley sands where water may swell the clays and shales and decrease the permeability of the sands.

From the foregoing it can be seen that with my improved fracturing composition the viscosity is increased rapidly so that it can be injected into a well and pumped through the tubing while it is at a low viscosity, and that the viscosity is reduced to the viscosity of the well fluids within a very short time, so that the well can be placed on production almost immediately without backflowing the gel into the well when the gel still has a viscosity high enough to carry solids such as granular props, which are customarily placed in the gel to hold a fracture open.

It can be seen also that, while the above description refers to specific concentrations, many variations in concentration can be made due to differences in the materials. This invention should therefore not be construed to be limited to the examples given, but should instead be limited only by the scope of the appended claims.

I claim:

1. A composition of matter comprising by weight 100 parts of a light hydrocarbon, between 3 and about 6 parts of a napalm soap, and between about 0.1 and 0.5 part of furfuryl alcohol.

2. A composition of matter comprising by weight 100 parts of a light hydrocarbon, between about 3 and about 6 parts of a napalm soap, between about 0.5 and 3 parts of water and between about 0.1 and 0.5 part of furfuryl alcohol.

3. A composition of matter comprising by weight 100 parts of kerosene, 4 parts of napalm soap, 1 part of water and 0.3 part of furfuryl alcohol.

4. A process for increasing the productivity of oil-producing formations comprising injecting into said formations at a pressure sufficient to fracture said formation a composition comprising by weight 100 parts of a light hydrocarbon, between about 3 and about 6 parts of a napalm soap, between about 0.5 and about 3 parts of water, and between about 0.1 and about 0.5 part of furfuryl alcohol, said composition being capable of becoming less viscous upon standing, injecting said composition into said formation at a viscosity substantially greater than the viscosity of the well fluids therein, and subsequently producing said well to remove said composition after the viscosity of said composition has been reduced to substantially the viscosity of said well fluids.

References Cited in the file of this patent

UNITED STATES PATENTS

| | | |
|---|---|---|
| 2,122,940 | Hodson | July 5, 1938 |
| 2,380,893 | Zimmer et al. | July 31, 1945 |
| 2,447,064 | Gebhart et al. | Aug. 17, 1948 |
| 2,516,137 | Morway et al. | July 25, 1950 |
| 2,516,138 | Morway | July 25, 1950 |
| 2,596,844 | Clark | May 13, 1952 |
| 2,599,553 | Hotten | June 10, 1952 |
| 2,642,142 | Clark | June 16, 1953 |